(12) United States Patent
Lassila et al.

(10) Patent No.: US 6,605,145 B1
(45) Date of Patent: Aug. 12, 2003

(54) ALKYLFORMAMIDE SURFACTANTS

(75) Inventors: Kevin Rodney Lassila, Macungie, PA (US); John Anthony Marsella, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/292,420

(22) Filed: Apr. 15, 1999

(51) Int. Cl.$^7$ ................................................. C08K 5/20
(52) U.S. Cl. .................. 106/287.25; 524/232; 524/230; 524/210
(58) Field of Search ................................ 524/210, 230, 524/232; 106/287.25

(56) References Cited

U.S. PATENT DOCUMENTS

| 5,098,478 A | 3/1992 | Krishnan et al. ............. 106/23 |
| 5,224,987 A | 7/1993 | Matrick ........................ 106/20 |
| 5,562,762 A | 10/1996 | Mrvos et al. ............. 106/22 H |

FOREIGN PATENT DOCUMENTS

| DE | 4341986 | 6/1995 |
| EP | 0036560 | 9/1981 |
| GB | 1357372 | 6/1974 |

OTHER PUBLICATIONS

Schwartz, J. "The Importance of Low Dynamic Surface Tension in Waterborne Coatings" Journal of Coatings Technology, Sep., 1992.

Wirth, W.; Storp, S.; Jacobson, W. "Mechanisms Controlling Leaf Retention of Agriculture Spray Solutions" Pestic. Sci. 1991, 33, 411–420.

Medina, S. W., Sutovich, M. N., "Using Surfactants to Formulate VOC Compliant Waterbased Inks", Am. Ink Maker 1994, 72 (2), 32–38.

Desando, et al. J. Chem Phys. 1983, 3238–3244.

Ishizuka et al. Chim. Phys. Appl. Prat. Ag. Surface, C. R. Cong., Int. Deterg., 5$^{th}$ 1969, vol. 1, pp 183–191.

European Search Report dated Feb. 1, 2001, Application No. 00107712.2–2109.

*Primary Examiner*—Peter D. Mulcahy
(74) *Attorney, Agent, or Firm*—Michael Leach

(57) ABSTRACT

This invention provides water-based compositions, particularly coating, ink, and agricultural compositions, manifesting reduced equilibrium and dynamic surface tension by the incorporation of a surface tension reducing amount of certain alkylformamide compounds of the structure

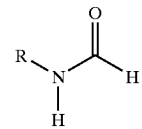

where R is a C5 to C11 alkyl group.

21 Claims, No Drawings

ALKYLFORMAMIDE SURFACTANTS

FIELD OF THE INVENTION

The invention relates to the use of alkylformamides to reduce the surface tension in water-based systems.

BACKGROUND OF THE INVENTION

The ability to reduce the surface tension of water is of great importance in waterborne coatings, inks, adhesives, and agricultural formulations because decreased surface tension translates to enhanced substrate wetting in actual formulations. Surface tension reduction in water-based systems is generally achieved through the addition of surfactants. Performance attributes resulting from the addition of surfactants include enhanced surface coverage, fewer defects, and more uniform distribution. Equilibrium surface tension performance is important when the system is at rest. However, the ability to reduce surface tension under dynamic conditions is of great importance in applications where high surface creation rates are utilized. Such applications include spraying, rolling and brushing of coatings or spraying of agricultural formulations, or high speed gravure or ink-jet printing. Dynamic surface tension is a fundamental quantity which provides a measure of the ability of a surfactant to reduce surface tension and provide wetting under such high speed application conditions.

Traditional nonionic surfactants such as alkylphenol or alcohol ethoxylates, and ethylene oxide (EO)/propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

There is a need for a family of surfactants which provide good equilibrium and dynamic surface tension properties, are low-foaming and would be widely accepted in the waterborne coating, ink, adhesive, and agricultural formulation industries.

The importance of reducing equilibrium and dynamic surface tension in applications such as coatings, inks, and agricultural formulations is well-appreciated in the art.

Low dynamic surface tension is of great importance in the application of waterborne coatings. In an article, Schwartz, J. "*The Importance of Low Dynamic Surface Tension in Waterborne Coatings*", Journal of Coatings Technology, September 1992, there is a discussion of surface tension properties in waterborne coatings and a discussion of dynamic surface tension in such coatings. Equilibrium and dynamic surface tension were evaluated for several surface active agents. It is pointed out that low dynamic surface tension is an important factor in achieving superior film formation in waterborne coatings. Dynamic coating application methods require surfactants with low dynamic surface tensions in order to prevent defects such as retraction, craters, and foam.

Efficient application of agricultural products is also highly dependent on the dynamic surface tension properties of the formulation. In an article, Wirth, W.; Storp, S.; Jacobsen, W. "*Mechanisms Controlling Leaf Retention of Agricultural Spray Solutions*"; Pestic. Sci. 1991, 33, 411–420, the relationship between the dynamic surface tension of agricultural formulations and the ability of these formulations to be retained on a leaf was studied. These workers observed a good correlation between retention values and dynamic surface tension, with more effective retention of formulations exhibiting low dynamic surface tension.

Low dynamic surface tension is also important in high-speed printing as discussed in the article "*Using Surfactants to Formulate VOC Compliant Waterbased Inks*", Medina, S. W.; Sutovich, M. N. Am. Ink Maker 1994, 72 (2), 32–38. In this article, it is stated that equilibrium surface tensions (ESTs) are pertinent only to ink systems at rest. EST values, however, are not good indicators of performance in the dynamic, high speed printing environment under which the ink is used. Dynamic surface tension is a more appropriate property. This dynamic measurement is an indicator of the ability of the surfactant to migrate to a newly created ink/substrate interface to provide wetting during high speed printing.

U.S. Pat. No. 5,098,478 discloses water-based ink compositions comprising water, a pigment, a nonionic surfactant and a solubilizing agent for the nonionic surfactant. Dynamic surface tension in ink compositions for publication gravure printing must be reduced to a level of about 25 to 40 dynes/cm to assure that printability problems will not be encountered.

U.S. Pat. No. 5,562,762 discloses an aqueous jet ink of water, dissolved dyes and a tertiary amine having two polyethoxylate substituents and that low dynamic surface tension is important in ink jet printing.

Desando, et al; *J. Chem Phys.* 1983, 78, 3238–3244 examined the dielectric absorption properties of n-octylformamide in conjunction with a study of the surfactant properties of n-octyl ammonium formate in nonpolar matrices such as toluene and polystyrene.

EP 36560 A2 discloses N-(higher alkyl) C1–C8 amides as foam stabilizers in synthetic resin compositions.

Various long chain N-(sec-alkyl) formamides were used as intermediates for the preparation of derivatives of the corresponding N-(sec-alkyl) amines [Ishizuka et al, *Chim. Phys. Appl. Prat. Ag. Surface, C. R. Cong. Int. Deterg., 5$^{th}$* 1969, Volume 1, pp 183–91]. Surface tension, wetting power, foaming power, and foam stability of the derivatives were studied, indicating they possess surfactant properties in aqueous media. No surfactant properties are noted for the formamides.

GB 1,357,372 discloses water-immiscible formamides as dispersion solvents for photographic color formers. Dibutylformamide and dibenzylformamide are noted as being particularly useful.

DE 4341986-A1 discloses a large number of carboxylic acid amides of the formula

including those where R may be H and $R^1$ and $R^2$ may be hydrogen or alkyl as well as many other organic groups, as crystallization inhibitors in certain aqueous azole fungicide compositions. Compounds I-40 and I-41 are 2-ethylhexylformamide and n-octylformamide, respectively.

SUMMARY OF THE INVENTION

This invention provides water-based compositions containing an organic or inorganic compound, particularly aqueous organic coating, ink, and agricultural compositions, having reduced equilibrium and dynamic surface tension by incorporation of an effective amount of an alkylformamide compound of the following structure:

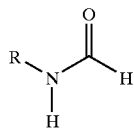

where R is a C5 to C11 alkyl group, provided that the organic compound is not an azole derivative fungicide. It is desirable that an aqueous solution of the alkylformamide demonstrates a dynamic surface tension of less than 45 dynes/cm at a concentration of ≦5 wt % in water at 23° C. and 1 bubble/second according to the maximum-bubble pressure method. The maximum-bubble-pressure method of measuring surface tension is described in *Langmuir* 1986, 2, 428–432, which is incorporated by reference.

Also provided is a method for lowering the equilibrium and dynamic surface tension of aqueous compositions by the incorporation of these alkylformamide compounds.

Also provided is a method for applying a water-based inorganic or organic compound-containing composition to a surface to partially or fully coat the surface with the water-based composition, the composition containing an effective amount of an alkylformamide compound of the above structure for reducing the dynamic surface tension of the water-based composition.

There are significant advantages associated with the use of these alkylformamides in water-based organic coatings, inks, and agricultural compositions and these advantages include:
- an ability to formulate water-borne coatings, inks, and agricultural compositions which may be applied to a variety of substrates with excellent wetting of substrate surfaces including contaminated and low energy surfaces;
- an ability to provide a reduction in coating or printing defects such as orange peel and flow/leveling deficiencies;
- an ability to produce water-borne coatings and inks which have low volatile organic content, thus making these surfactants environmentally favorable; and
- an ability to formulate coating and ink compositions capable of high speed application.

Because of their excellent surfactant properties and the ability to control foam, these materials are likely to find use in many applications in which reduction in dynamic and equilibrium surface tension and low foam are important. Applications in which low foam is important include various wet-processing textile operations, such as dyeing of fibers, fiber souring, and kier boiling, where low-foaming properties would be particularly advantageous; they may also have applicability in soaps, water-based perfumes, shampoos, and various detergents where their marked ability to lower surface tension while simultaneously producing substantially no foam would be highly desirable.

DETAILED DESCRIPTION OF THE INVENTION

This invention relates to the use of compounds of the formula

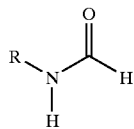

where R is a C5 to C11 alkyl group for the reduction of equilibrium and dynamic surface tension in water-based compositions containing an organic compound, particularly coating, ink, and agricultural compositions containing organic compounds such as polymeric resins, herbicides (excluding azole derivative fungicides), insecticides or plant growth modifying agents. It is desirable that an aqueous solution of the alkylformamide demonstrates a dynamic surface tension of less than 45 dynes/cm at a concentration of ≦5 wt % in water at 23° C. and 1 bubble/second according to the maximum-bubble-pressure method. The maximum-bubble-pressure method of measuring surface tension is described in *Langmuir* 1986, 2, 428–432, which is incorporated by reference.

In one aspect of the invention the alkylformamides of the above formula display excellent ability to reduce equilibrium and dynamic surface tension while producing substantially no foam.

The compounds of the invention may be prepared by reacting a suitable amine with an alkylformate

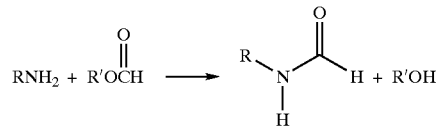

Alternatively, these compounds may be prepared by direct carbonylation of an amine in the presence of a suitable catalyst:

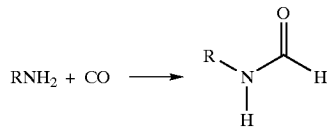

Both of these methods are well-known in the art.

The alkyl group may be a linear, branched, or cyclic C5 to C11 hydrocarbon moiety. In general, lower numbers of alkyl carbon or a higher degree of branching will increase the solubility of the surfactant but decrease the efficiency (i.e. a greater amount will be required to obtain a given reduction in surface tension). The alkyl groups may be linear or branched and the point of attachment to nitrogen may be on either a terminal or internal carbon. Examples of suitable alkyl groups include 1-pentyl, 2-pentyl, 3-pentyl, 2-(3-methylbutyl), 2-(2-methylbutyl), 1-(3-methylbutyl), 1-(2-methylbutyl), 1-hexyl, 2-hexyl, 3-hexyl, cyclohexyl, 1-(4-methylpentyl), 1-(3-methylpentyl), 1-(2-methylpentyl), 2-(4-methylpentyl), 3-(3-methylbutyl), 1-heptyl, 2-heptyl, 3-heptyl, 1-(5-methylhexyl), 1-(4-methylhexyl), 2-(3-methylhexyl), 1-octyl, 2-ethylhexyl, 2-octyl, 3-octyl, isooctyl, cyclooctyl, n-nonyl, 2-nonyl, 3-nonyl, 4-nonyl, isononyl, n-decyl, isodecyl, 2-decyl, 3-decyl, n-undecyl, cycloundecyl, and the like. Of course, this list is not comprehensive, and the particular alkyl group chosen for a particular use will depend on the performance characteristics required for that application. Alkyl groups which comprise a mixture of isomers are also suitable for the practice of this invention. C6 to C8 hydrocarbon moieties are preferred and C8 hydrocarbon moieties are especially preferred.

The alkylformamides are suitable for use in an aqueous composition comprising in water an inorganic compound which is a mineral ore or a pigment or an organic compound which is a pigment, a polymerizable monomer, such as addition, condensation and vinyl monomers, an oligomeric resin, a polymeric resin, a detergent, a caustic cleaning agent, a herbicide, especially a herbicide for chlorophyll-containing plants, an insecticide, or a plant growth modifying agent.

An amount of the alkylformamide compound that is effective to reduce the equilibrium and/or dynamic surface tension of the water-based, organic or inorganic compound-containing composition is added. Such effective amount may range from 0.001 to 10 g/100 mL, preferably 0.01 to 1 g/100 mL, and most preferably 0.05 to 0.5 g/100 mL of the aqueous composition. Naturally, the most effective amount will depend on the particular application and the solubility of the particular alkylformamide.

In the following water-based organic coating, ink, and agricultural compositions containing an alkylformamide according to the invention, the other listed components of such compositions are those materials well known to the workers in the relevant art.

A typical water-based protective or decorative organic coating composition to which the alkylformamide surfactants of the invention may be added would comprise the following components in an aqueous medium at 30 to 80% solids:

| Typical Water-Based Organic Coating Composition | |
|---|---|
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids/Defoamers |
| 0 to 50 wt % | Coalescing or Other Solvents |
| 0.01 to 10 wt % | Surfactant/Wetting Agent/Flow and Leveling Agents |
| 0.001 to 10 wt % | Alkylformamide |

A typical water-based ink composition to which the alkylformamide surfactants of the invention may be added would comprise the following components in an aqueous medium at 20 to 60% solids:

| Typical Water-Based Ink Composition | |
|---|---|
| 1 to 50 wt % | Pigment |
| 0 to 50 wt % | Pigment Dispersant/Grind Resin |
| 0 to 50 wt % | Clay base in appropriate resin solution vehicle |
| 5 to 99.9 wt % | Water-Borne/Water-Dispersible/Water-Soluble Resins |
| 0 to 30 wt % | Coalescing Solvents |
| 0.01 to 10 wt % | Surfactant/Wetting Agent |
| 0.01 to 10 wt % | Processing Aids/Defoamers/Solubilizing Agents |
| 0.001 to 10 wt % | Alkylformamide |

A typical water-based agricultural composition to which the alkylformamide surfactants of the invention may be added would comprise the following components in an aqueous medium at 0.1 to 80% ingredients:

| Typical Water-Based Agricultural Composition | |
|---|---|
| 0.1 to 50 wt % | Insecticide Herbicide or Plant Growth Modifying Agent |
| 0.01 to 10 wt % | Surfactant |
| 0 to 5 wt % | Dyes |
| 0 to 20 wt % | Thickeners/Stabilizers/Co-surfactants/Gel Inhibitors/Defoamers |
| 0 to 25 wt % | Antifreeze |
| 0.001 to 50 wt % | Alkylformamide |

EXAMPLE 1

This example illustrates the preparation of n-octylformamide. To a 500 mL round-bottomed flask equipped with condenser and nitrogen inlet were charged n-octyl amine (103.4 g, 0.80 mole) and ethyl formate (131.1 g, 1.77 mole). The reaction solution was stirred under nitrogen without heating. After about 5 min, the solution had become slightly warm, and after 15 minutes the reaction solution was boiling. About 30 min after the reagents had been mixed, the reaction solution began to cool, and the reactor contents were allowed to stir at room temperature overnight. GC analysis at this point indicated that the starting amine had been quantitatively converted to the formamide. The volatiles were removed by rotary evaporation and purified product was isolated by vacuum distillation through a 15×0.4 cm vigreux column; a brief forecut was discarded and the bulk of the material (bp 128° C., 0.2 mm Hg) was collected and used for all further measurements. The product was a colorless, nonviscous liquid and was identified as n-octylformamide by gas chromatography-mass spectrometry (gc-ms) and nuclear magnetic resonance (NMR) spectroscopy.

EXAMPLE 2

This example illustrates the preparation of 2-ethylhexylformamide. A 100 mL round-bottomed flask equipped with magnetic stirrer, condenser, and nitrogen inlet was charged with 2-ethylhexylamine (32.3 g, 0.25 mole) and ethyl formate (37.9 g, 0.51 mole). GC analysis performed shortly after charging the flask showed that the reaction was essentially complete. The reaction solution was refluxed for 3 h, cooled to room temperature, and the volatiles were removed by rotary evaporation to afford a light tan, non-viscous liquid. The product was purified by simple distillation to afford 37.7 g of colorless liquid identified by gc-ms and NMR as 2-ethylhexylformamide. GC analysis of this material indicated the presence of no contaminants.

EXAMPLE 3

This example illustrates the preparation of n-hexylformamide. A 500 mL round-bottomed flask equipped with magnetic stirrer, condenser, and nitrogen inlet was charged with n-hexylamine (74.7 g, 0.74 mole) and ethyl formate (155.3 g, 2.1 mole). The reaction solution was stirred under nitrogen without heating. Approximately 10 minutes after the reaction vessel had been charged, the contents began to reflux. After an additional hour, the reactor contents were still warm, but cooling, and were stirred overnight at room temperature. The volatiles were removed by rotary evaporation, and the product was purified by vacuum distillation through a 15×0.4 cm vigreux column. A 4.8 g forecut was discarded, and the bulk of the product (87.9 g) was collected at 97–98° C., 0.1 mm Hg). The product was identified as n-hexylformamide by gc-ms and NMR.

EXAMPLE 4

This example illustrates the preparation of n-decylformamide. To a 500 mL round-bottomed flask equipped with magnetic stirrer, condenser and nitrogen inlet were charged n-decyl amine (99.5 g, 0.63 mole) and ethyl formate (148 g, 2.0 mole). The reaction solution was stirred under nitrogen without heating. After about 15 min, the solution had become slightly warm, and after 30 min the reaction temperature was somewhat higher. Approximately 90 minutes after the reagents had been mixed, the reaction solution had cooled to room temperature. Stirring was continued for an additional 2 hr, and the volatiles were removed by rotary evaporation whereupon a crystallized mass formed. GC analysis at this point showed that the crude product assay was 96% n-decylformamide. Purified product was isolated by vacuum distillation through a 15×0.4 cm Vigreux column; a forecut (10.2 g) was discarded and the bulk of the material (78.6 g, bp 151–154° C., 0.2 mm Hg) was collected and used for all further measurements. The pot residue (24.9 g) was discarded. The product was a white solid and was identified as n-decylformamide by gas chromatography-mass spectrometry (gc-ms) and nuclear magnetic resonance (NMR) spectroscopy.

In the following Examples dynamic surface tension data were obtained for aqueous solutions of various compounds using the maximum bubble pressure method at bubble rates from 0.1 bubbles/second (b/s) to 20 b/s. These data provide information about the performance of a surfactant at conditions from near-equilibrium (0.1 b/s) through extremely high surface creation rates (20 b/s). In practical terms, high bubble rates correspond to high printing speeds in lithographic printing, high spray or roller velocities in coating applications, and rapid application rates for agricultural products.

EXAMPLE 5

Dynamic surface tension data were obtained for aqueous solutions of n-octyl-pyrrolidone using the above procedure. This compound is widely marketed to the coating and printing industries. The data are presented in Table 1.

TABLE 1

Dynamic Surface Tension (dyne/cm) - N-n-Octylpyrrolidone

| Concentration (wt %) | 0.1 b/s | 1 b/s | 6 b/s | 15 b/s | 20 b/s |
| --- | --- | --- | --- | --- | --- |
| 0.003 | 65.1 | 68.6 | 70.8 | 71.4 | 71.1 |
| 0.03 | 46.5 | 49.3 | 54.4 | 58.7 | 59.6 |
| 0.07 | 35.2 | 36.6 | 39.6 | 43.0 | 43.9 |
| 0.10 | 29.9 | 31.0 | 33.4 | 36.5 | 37.2 |
| 0.21 | 27.6 | 27.8 | 28.4 | 30.0 | 30.6 |

These data illustrate that n-octylpyrrolidone effectively reduced the surface tension of water under both static and dynamic conditions. A 0.1 wt % solution, for example, lowered the surface tension to below 30 dyne/cm at a surface creation rate corresponding to 1 b/s and was able to maintain a surface tension well below 40 dyne/cm even at the surface creation rate of 20 b/s.

EXAMPLE 6

Aqueous solutions of n-octylformamide (n-OF) were prepared and their surface tensions were measured using the procedure described above. The structure of the product is shown below, and the data are set forth in Table 2.

TABLE 2

Dynamic Surface Tension (dyne/cm) - n-OF

| Concentration (wt %) | 0.1 b/s | 1 b/s | 6 b/s | 15 b/s | 20 b/s |
| --- | --- | --- | --- | --- | --- |
| 0.03 | 42.8 | 46.1 | 52.2 | 58.5 | 60.4 |
| 0.05 | 35.6 | 37.7 | 42.5 | 48.6 | 50.5 |
| 0.07 | 30.9 | 32.5 | 36.3 | 41.5 | 43.7 |
| 0.1 | 25.7 | 26.6 | 28.7 | 34.4 | 36.3 |

A plot of ln(conc.) vs surface tension observed at 0.1 b/s was used to determine that the solubility limit of this material is 0.1 wt %.

The data show that this material has an ability to reduce the surface tension of aqueous systems which is superior to that of n-octylpyrrolidone, a compound which is widely marketed as a surfactant in the coating, ink, and adhesive industries. Like n-octylpyrrolidone, at a use level of 0.1 wt % in water, the compound of this invention is able to provide a surface tension below 30 dyne/cm at 0.1 b/s, and maintain a surface tension well below 40 dyne/cm at 20 b/s. It has not previously been recognized that alkyl formamides would have the ability to reduce the surface tension of an aqueous system. The ability to provide such outstanding surface tension reduction in aqueous systems, and the fact that this material exhibits foam control [see Example 10] far superior to that of n-octylpyrrolidone would not be expected based upon the teachings of the prior art.

EXAMPLE 7

Aqueous solutions of 2-ethylhexylformamide (2-EHF) were prepared and their surface tensions were measured using the procedure described above. The data are set forth in Table 3.

TABLE 3

Dynamic Surface Tension (dyne/cm) - 2-EHF

| Concentration (wt %) | 0.1 b/s | 1 b/s | 6 b/s | 15 b/s | 20 b/s |
| --- | --- | --- | --- | --- | --- |
| 0.03 | 51.1 | 53.0 | 57.0 | 60.1 | 60.3 |
| 0.05 | 45.9 | 47.2 | 49.9 | 52.6 | 53.3 |
| 0.07 | 42.8 | 43.8 | 46.0 | 48.3 | 49.1 |
| 0.1 | 39.1 | 39.9 | 41.6 | 43.5 | 44.2 |
| 0.2 | 32.1 | 32.4 | 33.3 | 34.9 | 35.5 |

A plot of ln(conc.) vs surface tension observed at 0.1 b/s was used to determine that the solubility limit of this material is 0.2 wt %.

These data illustrate that formamides containing branched alkyl groups can be used in the practice of this invention and that the effect of branching is to decrease the efficiency of the material (i.e. more surfactant is required to obtain an equivalent reduction in surface tension) and to increase the solubility. The former effect is illustrated by observing that the surface tensions observed for 0.1 wt % solutions of the branched compound of this example were higher than those observed for 0.1 wt % solutions of the linear compound of Example 6. The ability of these types of materials to reduce the surface tension of aqueous systems, and produce substantially no foam [see Example 10] has not previously been recognized. This combination of properties would be of benefit in waterborne coatings, inks, adhesives, and agricultural formulations.

EXAMPLE 8

Aqueous solutions of n-hexylformamide (n-HF) were prepared and their surface tensions were measured using the procedure described above. The data are set forth in Table 4.

TABLE 4

Dynamic Surface Tension (dynes/cm) - n-HF

| Concentration (wt %) | 0.1 b/s | 1 b/s | 6 b/s | 15 b/s | 20 b/s |
| --- | --- | --- | --- | --- | --- |
| 0.1 | 56.0 | 57.6 | 58.8 | 60.3 | 60.6 |
| 0.5 | 37.2 | 38.0 | 38.8 | 40.1 | 40.3 |
| 1.0 | 28.4 | 29.0 | 29.6 | 30.1 | 31.1 |
| 2.0 | 27.4 | 28.4 | 29.3 | 30.7 | 30.3 |

A plot of ln(conc.) vs surface tension observed at 0.1 b/s was used to determine that the solubility limit of this material is 1.1 wt %.

These data illustrate that decreasing the carbon number increased the solubility of the surfactant. It is noteworthy that a 1.0 wt % solution of the surfactant provided the very low surface tension of 31.1 dyne/cm at the high surface creation rate of 20 b/s. This outstanding performance, and the fact that aqueous solutions of this material produced almost no foam, indicate that this compound would be of great value in coating, ink, adhesive, and agricultural formulations.

EXAMPLE 9

Aqueous solutions of n-decylformamide (n-DF) were prepared and their surface tensions were measured using the procedure described above. The data are set forth in Table 5.

TABLE 5

Dynamic Surface Tension (dyne/cm) - n-DF

| Concentration (wt %) | 0.1 b/s | 1 b/s | 6 b/s | 15 b/s | 20 b/s |
| --- | --- | --- | --- | --- | --- |
| 0.005 | 53.4 | 67.1 | 70.6 | 72.5 | 73.1 |
| 0.007 | 36.3 | 59.2 | 70.3 | 72.3 | 72.9 |
| 0.01 | 32.4 | 55.4 | 69.1 | 72.5 | 72.8 |

A plot of ln(conc.) vs surface tension observed at 0.1 b/s was used to determine that the solubility limit of this material is 0.01 wt %.

The compound of this example was extremely efficient, providing a surface tension of 32.4 dyne/cm at 0.1 b/s at the low concentration of 0.01 wt %. Thus this material would provide excellent performance at low use levels in applications in which the rate of surface creation is not too great.

EXAMPLE 10

The foaming properties of 0.1 wt % solutions of the N-octylpyrrolidone and the alkylformamide surfactants of this invention were examined using a procedure based upon ASTM D 1173-53. In this test, a 0.1 wt % solution of the surfactant is added from an elevated foam pipette to a foam receiver containing the same solution. The foam height is measured at the completion of the addition ("Initial Foam Height") and the time required for the foam to dissipate at the air-liquid interface ("Time to 0 Foam") is recorded. This test provides a comparison between the foaming characteristics of various surfactant solutions. In general, in coatings, inks, and agricultural formulations, foam is undesirable because it complicates handling and can lead to coating and print defects, and to inefficient application of agricultural materials. The data are presented in Table 6.

TABLE 6

Foam Test Data

| Compound | Initial Foam Height (cm) | Time to 0 Foam or cm Foam after 5 min |
| --- | --- | --- |
| 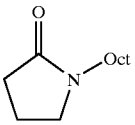 Ex 5 | 4.0 | 1.0 cm |
| 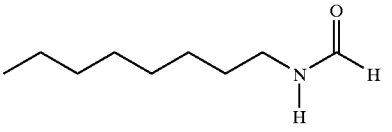 Ex 6 | 0.9 | 5 s |

TABLE 6-continued

Foam Test Data

| Compound | Initial Foam Height (cm) | Time to 0 Foam or cm Foam after 5 min |
|---|---|---|
| 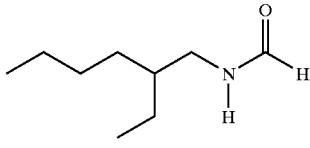 Ex 7 | 0.5 | 4 s |
| 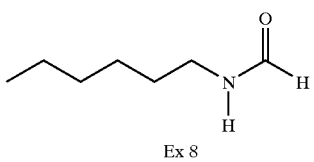 Ex 8 | | |
| 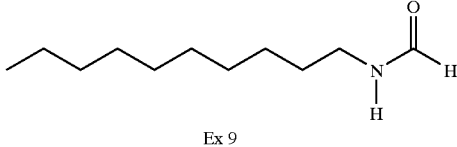 Ex 9 | 2.4 | 12 s |

The data in Table 6 show that n-octylpyrrolidone is quite foamy, complicating its use in coating, ink, and agricultural formulations. In contrast, the compounds of this invention produce very little foam, and the foam which forms dissipates quickly. Thus these materials have desirable properties with respect to their use in coatings, inks and agricultural formulations.

The ability of a surfactant in aqueous systems to reduce surface tension under both equilibrium and dynamic conditions is of great importance in the performance of water-based coatings, inks, adhesives, and agricultural formulations. Low equilibrium surface tension allows the development of excellent properties subsequent to application. Low dynamic surface tension results in enhanced wetting and spreading under the dynamic conditions of application, resulting in more efficient use of the formulations and fewer defects. In waterborne coatings, inks, adhesives, and agricultural formulations, the formation of foam is generally undesirable because it complicates handling and can cause defects or result in inefficient application. The alkylformamide surfactants of this invention display an outstanding ability to provide equilibrium and dynamic surface tension reduction in aqueous formulations while producing substantially no foam. These materials would therefore be expected to be useful in aqueous coating, ink, and agricultural formulations.

STATEMENT OF INDUSTRIAL APPLICATION

The invention provides compositions suitable for reducing the equilibrium and dynamic surface tension in water-based coating, ink, and agricultural compositions.

We claim:

1. In a method for coating a surface which comprises applying a water-based protective or decorative organic coating, ink or agricultural composition to a surface to partially or fully coat the surface, the composition containing an effective amount of a surfactant for reducing the dynamic surface tension of the composition, the improvement which comprises employing as the surfactant an alkylformamide of the structure

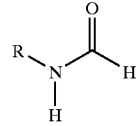

where R is a C5 to C11 alkyl group, provided the organic compound is not an azole derivative fungicide.

2. The method of claim 1 in which an aqueous solution of the alkylformamide demonstrates a dynamic surface tension of less than 45 dynes/cm at a concentration of ≦5 wt % in water at 23° C. and 1 bubble/second according to the maximum-bubble-pressure method.

3. The method of claim 2 in which R is a C6 to C8 alkyl.

4. The method of claim 2 in which R is a C8 alkyl.

5. The method of claim 4 in which R is 2-ethylhexyl or n-octyl.

6. The method of claim 1 in which the alkylformamide is n-octylformamide; n-hexylformamide; 2-ethylhexylformamide or n-decylformamide.

7. The method of claim 1 in which the alkylformamide is n-octylformamide.

8. The method of claim 1 in which the alkylformamide is 2-ethylhexylformamide.

9. The method of claim 2 in which the measurement is made at 20 bubbles/second.

10. In an aqueous protective or decorative organic coating, ink or agricultural composition comprising in water an inorganic compound which is a mineral ore or a pigment or an organic compound which is a pigment, a polymerizable monomer, an oligomeric resin, a polymeric resin, a detergent, a herbicide, an insecticide, or a plant growth modifying agent and an effective amount of an alkylformamide for reducing the dynamic surface tension of the-composition, the alkylformamide having a structure according to the formula:

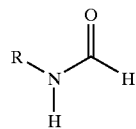

where R is a C5 to C11 alkyl group, provided the herbicide is not an azole derivative fungicide.

11. The composition of claim 10 in which an aqueous solution of the alkylformamide demonstrates a dynamic surface tension of less than 45 dynes/cm at a concentration of $\leq 5$ wt % in water at 23° C. and 1 bubble/second according to the maximum-bubble-pressure method.

12. The composition of claim 11 in which R is a C6 to C8 alkyl.

13. The composition of claim 11 in which R is a C8 alkyl.

14. The composition of claim 13 in which R is 2-ethylhexyl or n-octyl.

15. The composition of claim 10 in which the alkylformamide is n-octylformamide; n-hexylformamide; 2-ethylhexylformamide or n-decylformamide.

16. The composition of claim 10 in which the alkylformamide is n-octylformamide.

17. The composition of claim 10 in which the alkylformamide is 2-ethylhexylformamide.

18. The composition of claim 11 in which the measurement is made at 20 bubbles/second.

19. In an aqueous organic coating composition of 30 to 80 wt % components, which components comprise 0 to 50 wt % pigment dispersant, grind resin or mixtures thereof;

0 to 80 wt % coloring pigment, extender pigment, anticorrosive pigment other pigment types or mixtures thereof;

5 to 99.9 wt % water-borne, water-dispersible or water-soluble resin or mixtures thereof;

0 to 30 wt % slip additive, antimicrobial agent, processing aid, defoamer or mixtures thereof;

0 to 50 wt % coalescing or other solvents;

0.01 to 10 wt % surfactant, wetting agent, flow and leveling agents or mixtures thereof;

the improvement which comprises 0.01 to 5 wt % alkylformamide having a structure according to the formula:

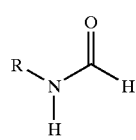

where R is a C5 to C11 alkyl group.

20. In an aqueous ink composition of 20 to 60 wt % components, which components comprise 1 to 50 wt % pigment 0 to 50 wt % pigment dispersant, grind resin or mixtures thereof;

0 to 50 wt % clay base in a resin solution vehicle;

5 to 99 wt % water-borne, water-dispersible or water-soluble resin or mixtures thereof;

0 to 30 wt % coalescing solvent;

0.01 to 10 wt % processing aid, defoamer, solubilizing agent or mixtures thereof;

0.01 to 10 wt % surfactant, wetting agent or mixtures thereof;

the improvement which comprises 0.01 to 5 wt % alkylformamide having a structure according to the formula:

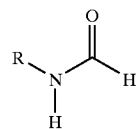

where R is a C5 to C11 alkyl group.

21. In an aqueous agricultural composition of 0.1 to 80 wt % components, which components comprise 1 to 50 wt % a herbicide for chlorophyll-containing plants, insecticide, plant growth modifying agent or mixtures thereof;

0 to 5 wt % dye;

0 to 20 wt % thickener, stabilizer, cosurfactant, gel inhibitor, defoaming agent or mixtures thereof;

0 to 25 wt % antifreeze;

0 to 50 wt % coalescing or other solvents;

0.01 to 10 wt % surfactant;

the improvement which comprises 0.1 to 50 wt % alkylformamide having a structure according to the formula:

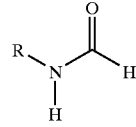

where R is a C5 to C11 alkyl group, provided the herbicide is not an azole derivative fungicide.

\* \* \* \* \*